United States Patent
Boudani et al.

(10) Patent No.: US 8,599,876 B2
(45) Date of Patent: Dec. 3, 2013

(54) METHOD OF TRANSMISSION OF DIGITAL IMAGES AND RECEPTION OF TRANSPORT PACKETS

(75) Inventors: Ali Boudani, Rennes (FR); Gilles Straub, Acigné (FR); Mary-Luc Champel, Marpire (FR); Philippe Lemonnier, Gevèze (FR)

(73) Assignee: Thomson Licensing, Issy-les-Moulineaux (FR)

( * ) Notice: Subject to any disclaimer, the term of this patent is extended or adjusted under 35 U.S.C. 154(b) by 1178 days.

(21) Appl. No.: 12/322,082

(22) Filed: Jan. 29, 2009

(65) Prior Publication Data

US 2009/0313669 A1 Dec. 17, 2009

(30) Foreign Application Priority Data

Feb. 1, 2008 (FR) ...................................... 08 50648

(51) Int. Cl.
*H04J 3/24* (2006.01)
*H04L 12/28* (2006.01)

(52) U.S. Cl.
USPC .......................................... 370/474; 370/395

(58) Field of Classification Search
USPC .................................................. 370/474, 395
See application file for complete search history.

(56) References Cited

U.S. PATENT DOCUMENTS

| 5,650,825 | A | 7/1997 | Naimpally et al. | |
|---|---|---|---|---|
| 5,923,384 | A | 7/1999 | Enomoto et al. | |
| 6,272,149 | B1 | 8/2001 | Fujisaki | |
| 6,980,731 | B1 * | 12/2005 | Tahara et al. | 386/208 |
| 2001/0003469 | A1 * | 6/2001 | Emomoto et al. | 348/705 |
| 2002/0164149 | A1 * | 11/2002 | Wilkinson | 386/46 |
| 2005/0195823 | A1 * | 9/2005 | Chen et al. | 370/395.1 |
| 2007/0121678 | A1 | 5/2007 | Brooks et al. | |

FOREIGN PATENT DOCUMENTS

| EP | 0 690 630 A2 | 1/1996 |
|---|---|---|
| EP | 1 098 531 A2 | 5/2001 |

OTHER PUBLICATIONS

Society of Motion Picture and Television Engineers, SMPTE Standard for Televisio—SDTV Digital Signal/Data-Serial Digital Interface, 2008, SPMTE 259M.*
"1.5 Gb/s Signa/Data Serial Interface" SMPTE Standard, vol. 292-2006, Jan. 1, 2006, p. 11pp, XP009108393 p. 2, alinea 3.1 p. 3, alinea 3.3* figure 1.
Wilkinson J. H. "The serial digital data interface (SDDI)" Broadcasting Convention, International (Conf. Publ. No. 428) Amsterdam, Netherlands Sep. 12-16, 1996, London, UK, IEE, UK Sep. 12, 1996 pp. 425-430 XPO06510058 ISBN: 978-0-85296-663-1.
International Search Report dated Nov. 19, 2008.
Mochida et al., "The i-Visto Gateway XG-Uncompressed HDTV Multiple Transmission Technology for 10-Gbit/s Networks", NTT Technical Review.

* cited by examiner

*Primary Examiner* — Mark Rinehart
*Assistant Examiner* — Angel Brockman
(74) *Attorney, Agent, or Firm* — Myers Wolin LLC

(57) ABSTRACT

Method for transmission of images comprising:
  a reception of a source digital image comprising padding lines and
  data lines, the data lines comprising ancillary data and video data.
In order to optimise the use of a transmission channel, the method also comprises:
  a filtering of padding lines to form sets of data comprising ancillary data and video data;
  a cutting of the sets into fragments of a maximum fragment length that is a function of a maximum transport packet length;
  an insertion of at least one image number in each of the fragments, each of the ancillary data and video data being associated with this number;
  an insertion of fragments into transport packets; and
  a transmission of the transport packets according to an internet protocol.
The invention also relates to a corresponding method for reception.

16 Claims, 8 Drawing Sheets

METHOD OF TRANSMISSION OF DIGITAL IMAGES AND RECEPTION OF TRANSPORT PACKETS

Figure 1:
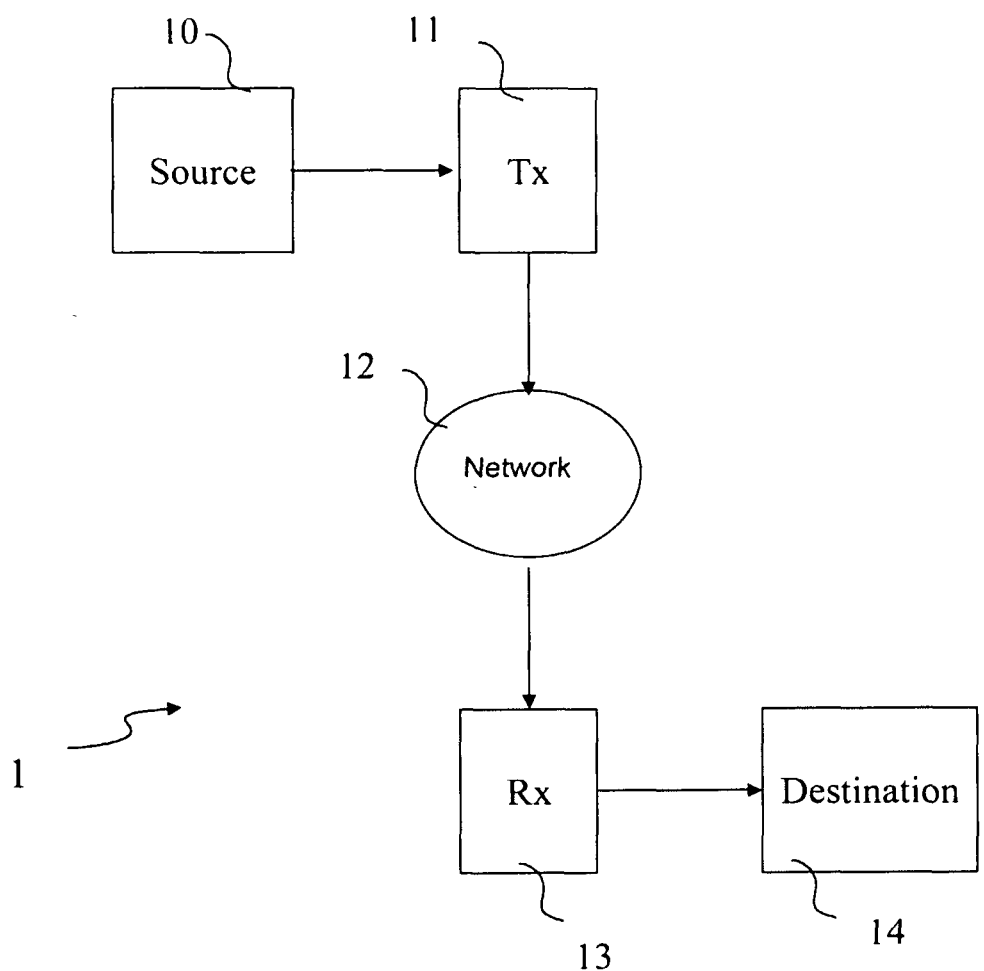

This application claims the benefit, under 35 U.S.C. §119 of French Patent Application 08/50648, filed Feb. 1, 2008.

FIELD OF INVENTION

The present invention relates to the video domain and more specifically to the transmission of a video stream on a communication channel and the corresponding reception.

TECHNOLOGICAL BACKGROUND

According to the prior art, audio/video data are transmitted between a source and a destination according to specific communications protocols and formats. Hence, the SDI (Serial Digital Interface specified in the SMPTE 259M-2006 standard entitled "SDTV1 Digital Signal/Data- Serial Digital Interface") interfaces or HD-SDI (High Definition-SDI specified in the SMPTE 292-2006 standard entitled "1.5 Gb/si Signal/Data Serial Interface") define the interfaces particularly well adapted to the exchange of audio/video data streams for television.

Moreover, Internet type networks are highly prevalent and enable the transmission of audio-video streams. The RFC3497 standard entitled "RTP Payload Format for Society of Motion Picture and Television Engineers (SMPTE) 292M Video" specifies how a HD-SDI stream can be transmitted on a network complying with the protocol RTP/IP (Real time Transport Protocol on Internet Protocol).

This technique has the disadvantage of being relatively greedy in bandwidth.

SUMMARY OF THE INVENTION

The purpose of the invention is to overcome the disadvantages of the prior art.

More specifically, the purpose of the invention is to enable the transmission of audio/video data on a transmission channel with an optimization of use of the available bandwidth on the transmission channel.

The invention relates to a method for transmission of digital images (for example according to an SDI format). In order to optimise the use of the bandwidth on a transmission channel, the method comprises:
  reception of a source digital image comprising padding lines and data lines, the data lines comprising ancillary data and video data,
  filtering of padding lines to form sets of data comprising ancillary data and video data,
  a cutting of the sets into fragments,
  insertion of at least one image number in the fragments, each of the ancillary data and video data being associated with an image number,
  insertion of fragments into transport packets, and
  transmission of transport packets.

In this way, the padding lines not being present in the transport packets, the bandwidth required to transport these packets is reduced. Moreover, the number of each image being associated with each fragment present in the transport packets, an image with the video and ancillary data present in the source digital image can be constructed on the reception of transport packets.

It is noted that the steps of filtering, cutting out and insertions can be isolated or, conversely, combined totally or partially (two or more of these steps being regrouped into a single step).

Advantageously, the method comprises an insertion of an item of information representative of the source digital image format in the fragments.

According to a particular characteristic, the reception step of a source digital image is made on a serial interface (for example SDI or HD-SDI).

According to another particular characteristic, the step of transmission of transport packets is carried out on a link according to an Internet protocol (for example IP).

Advantageously, the video data of each fragment correspond to a single image line of the source digital image, the nature of video data being the same in the source digital image and in each fragment (that is, a source data corresponding to a pixel belonging to a line in the source digital image corresponds to source data of the same pixel in each fragment). Thus there is correspondence between each line of the source digital image and each line of the set of fragments formed from this source image.

According to another embodiment, the video data of each fragment correspond to at least two lines of the source digital image, the nature of video data being the same in the source digital image and in each fragment.

According to an advantageous characteristic that enables further reduction of the required bandwidth, without significantly reducing the video quality, the method comprises a step of reduction of the size of each item of elementary data.

According to another advantageous characteristic also enabling further reduction of the required bandwidth, without significantly reducing the video quality, the method comprises a step of compression of the video data of the source digital image to form at least one set of compressed video data, each fragment comprising the set or sets of compressed video data.

Advantageously, in each source digital image, the video data are not compressed. This is the case when in the digital image, each pixel is represented by specific video data. Thus, each digital image video data item is associated with a single pixel.

The invention also relates to a method for reception of transport packets, each transport packet comprising data representative of at least one part of a digital image. The reception method is compatible with the transmission method and comprises:
  a reception of at least one transport packet, each transport packet comprising at least a fragment of ancillary data and/or video data,
  a construction of lines of data comprising video data and being able to contain ancillary data from at least one fragment contained in the transport packet(s),
  an insertion of lines of data and an insertion of padding data in a digital image, to form a digital image.

Advantageously, the reception method comprises reception of an item of information representative of a digital image format, the construction and insertion of lines of data and padding data in a digital image being carried out in compliance with information representative of a digital image format. In this way, the constructed digital image is compatible with a specific format, the location of lines in the image and the location of data in the lines being defined by this specific format according to respectively line type (padding or data) and data type (ancillary, video or padding).

According to an advantageous characteristic, the reception method comprises a digital image transmission step to a destination item of equipment.

According to a particular characteristic, the construction comprises an extraction of video data from each fragment corresponding to at least one line of the image, the nature of video data being the same in each fragment and in the digital image.

According to a particular characteristic, the reception method comprises an insertion step of padding bits in each elementary item of data received. Hence, an image can be constructed while respecting a defined image format (for example, when the size of video data is reduced in the transport packets).

According to another characteristic, the reception method comprises a decoding step of compressed video data to form at least one set of non-compressed video data.

Advantageously, in each digital image, the video data are not compressed.

The invention also relates to:
- a corresponding transport packets transmitter,
- a transmission system comprising a digital image source and a transmitter of transport packets,
- a corresponding transport packets receiver,
- a reception system comprising a receiver of corresponding transport packets and a digital image destination item of equipment, and
- a system comprising a transmitter of transport packets and a receiver of transport packets.

LIST OF FIGURES

Figure 2:
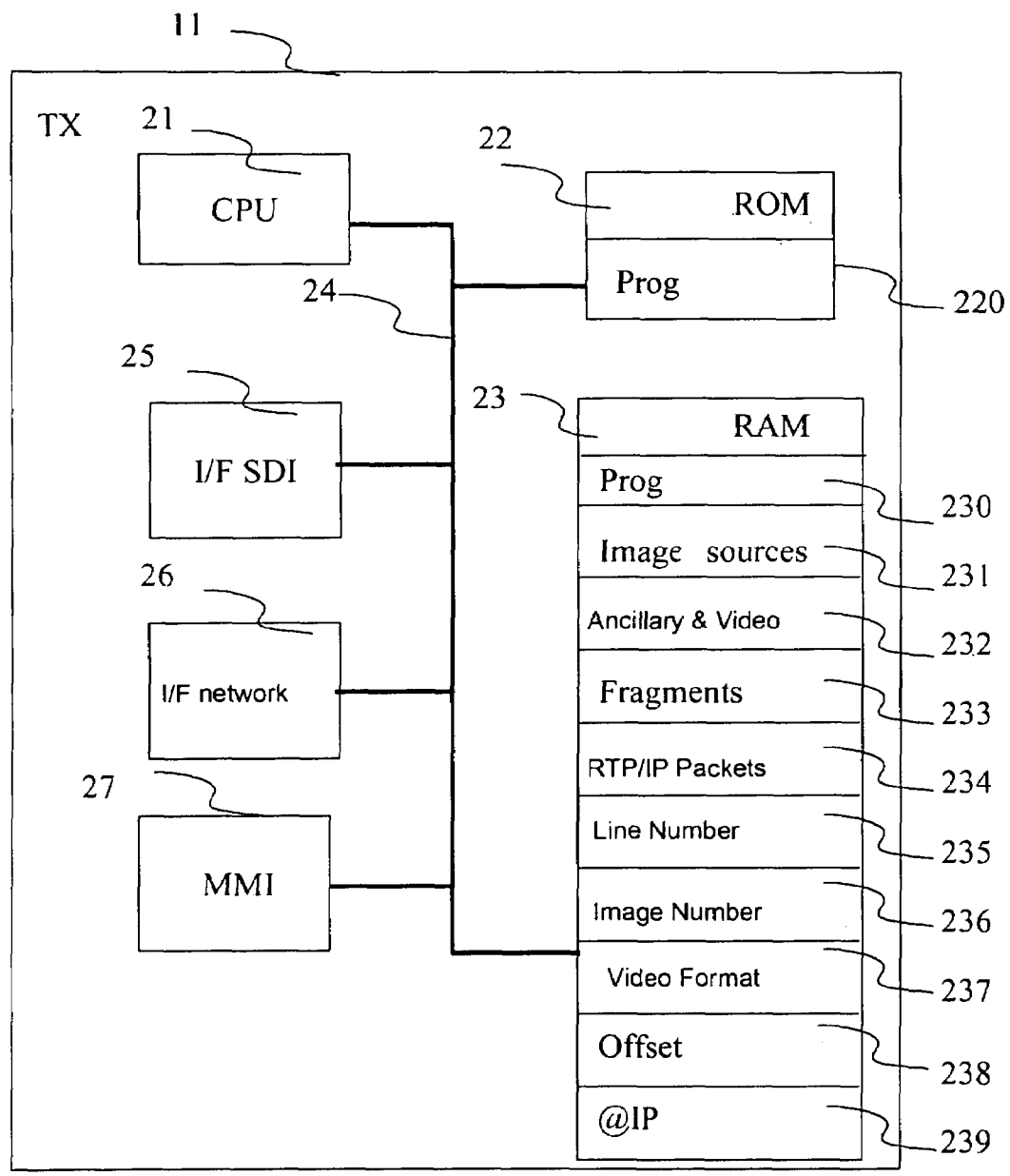
Figure 3:
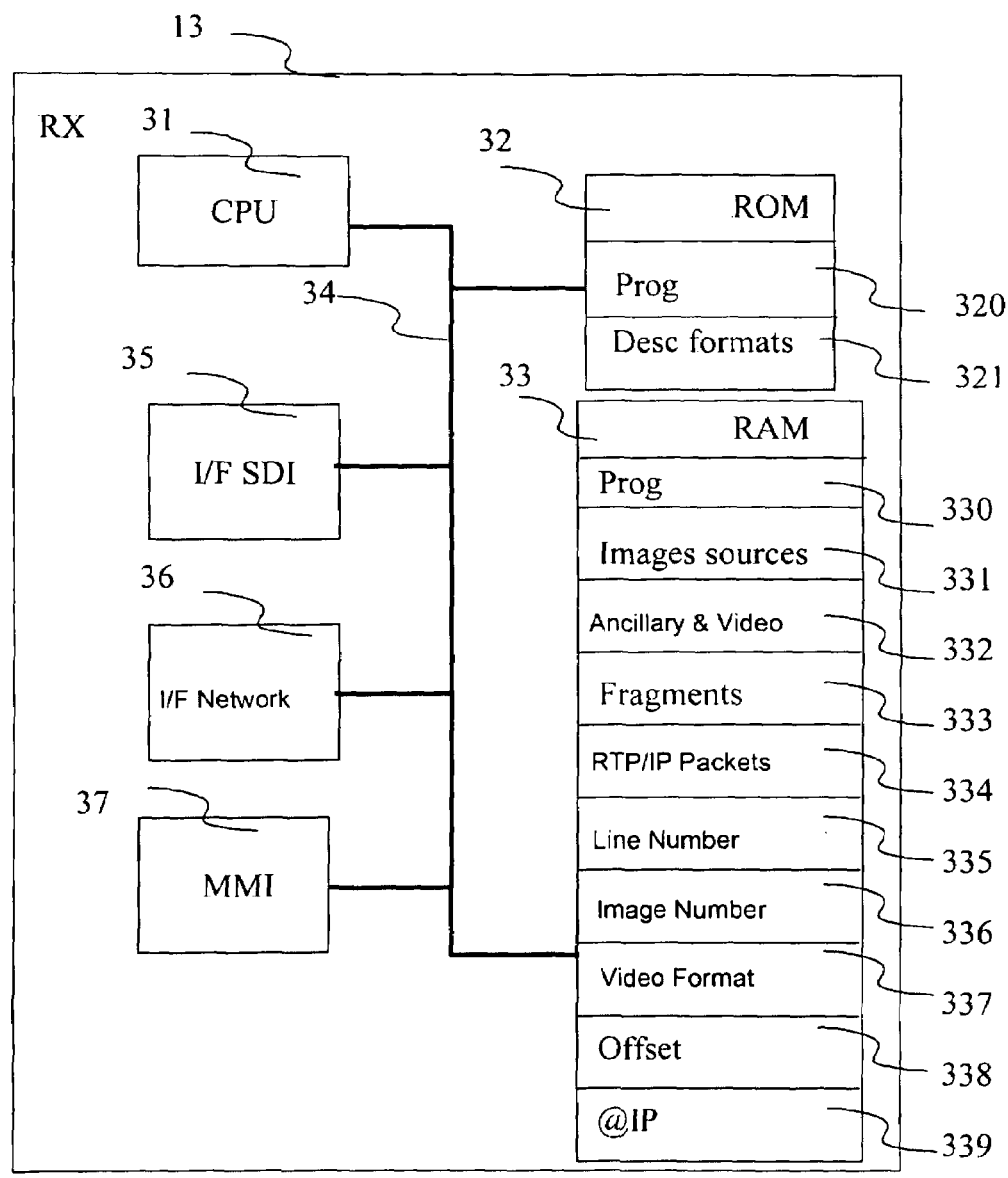
Figure 4:
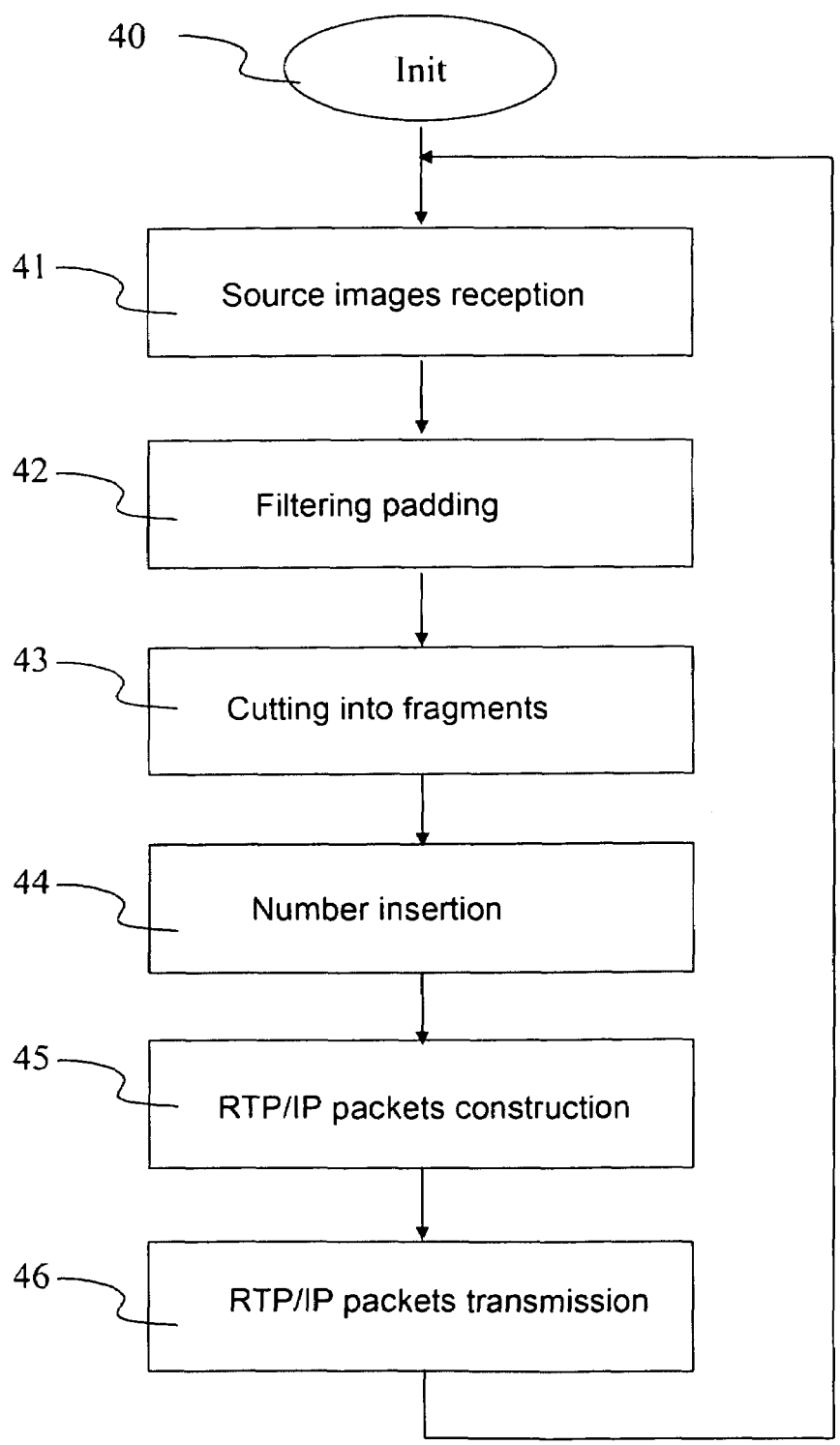
Figure 5:
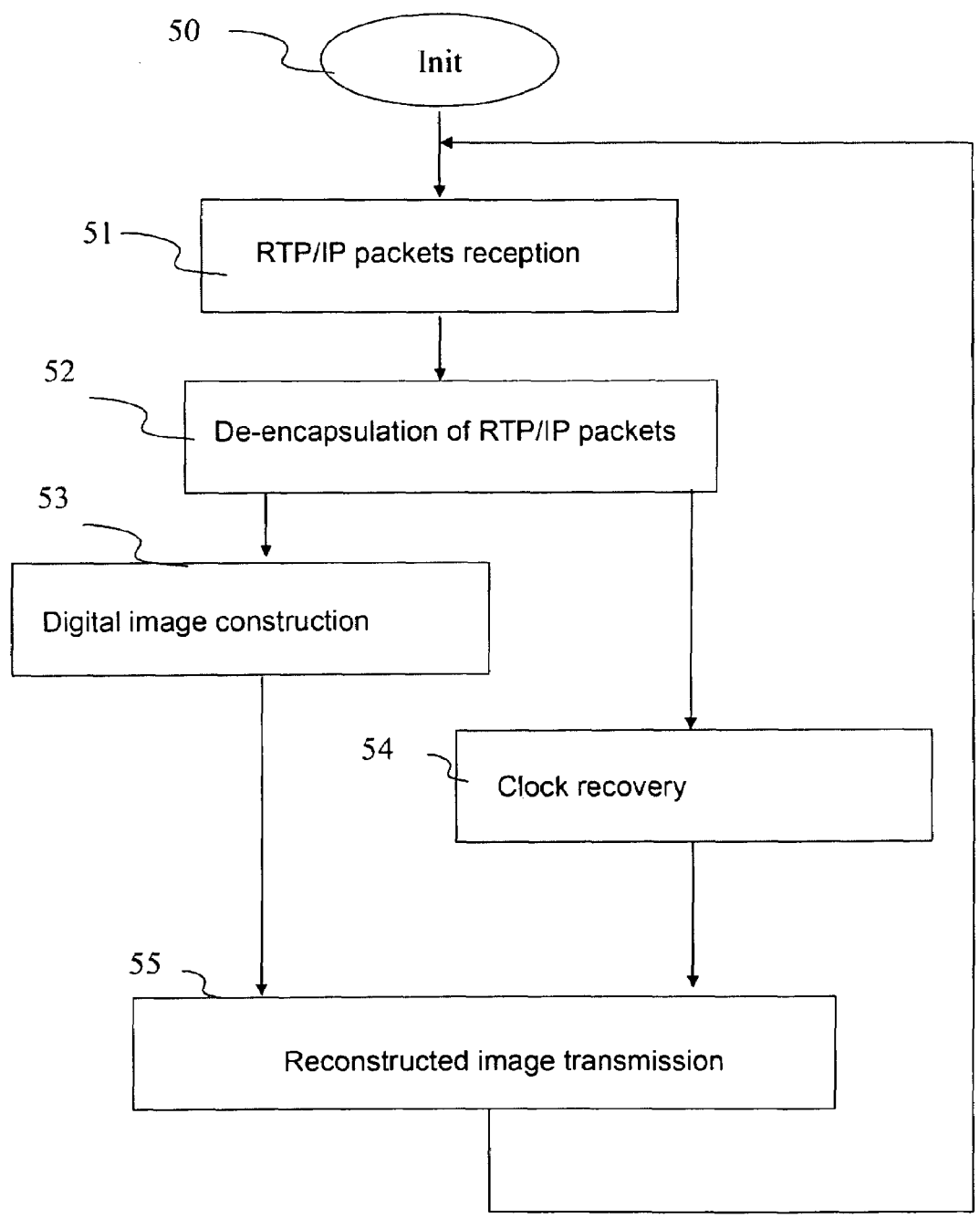
Figure 6:
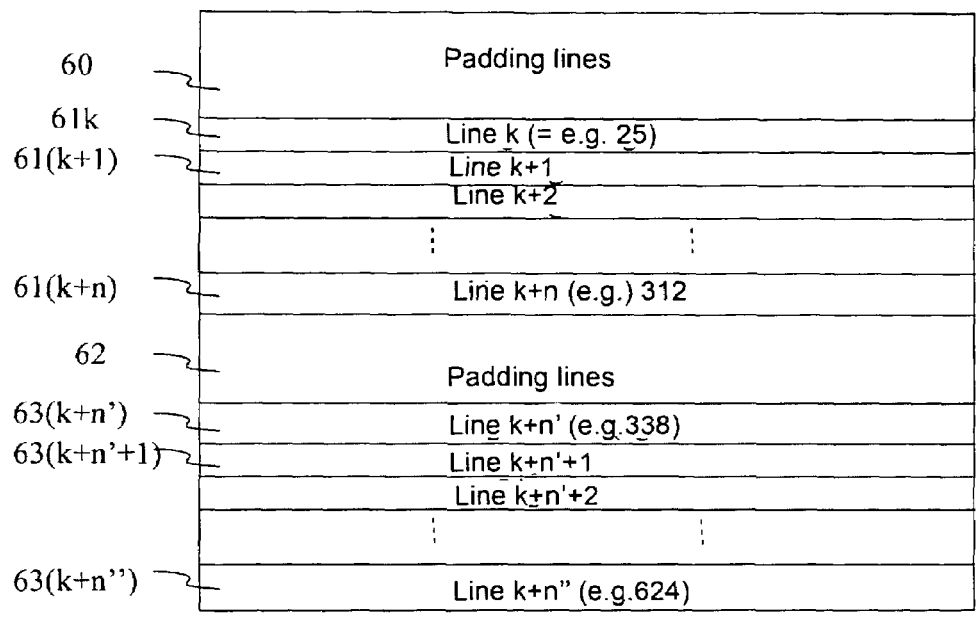
Figure 7:
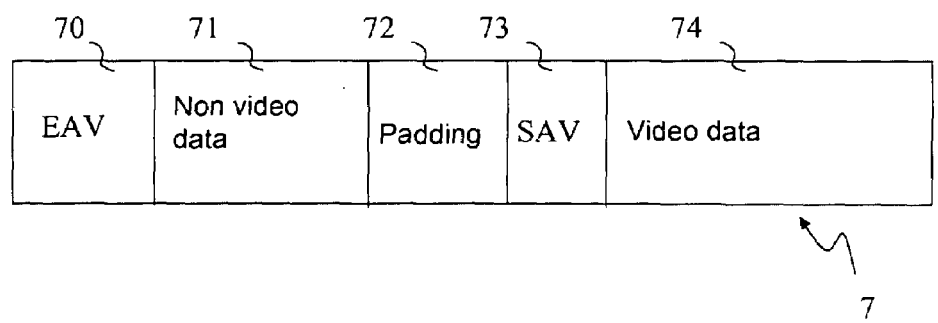
Figure 8:
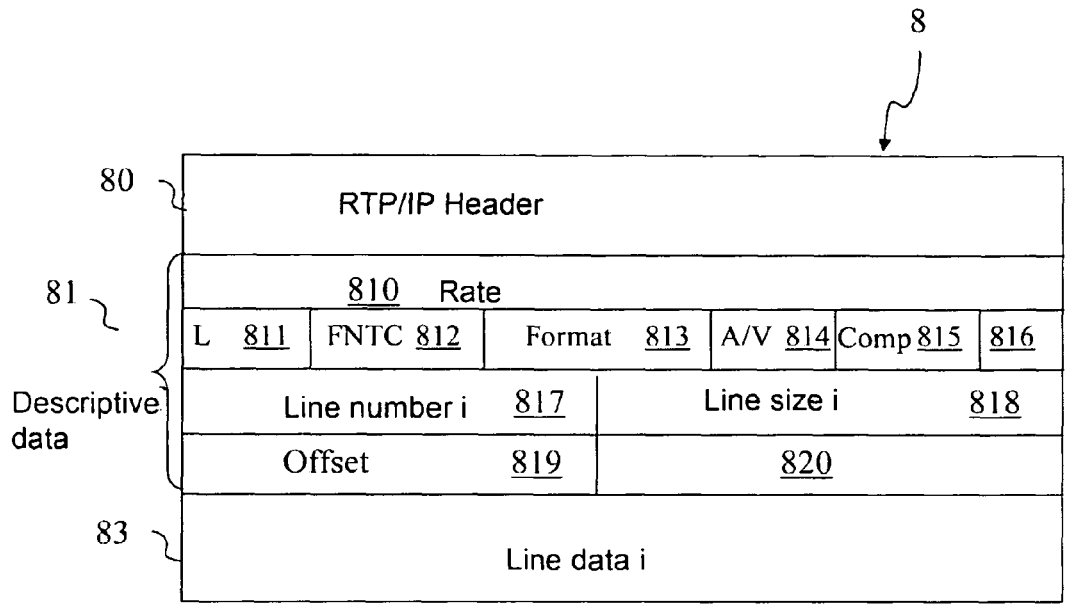
Figure 9:
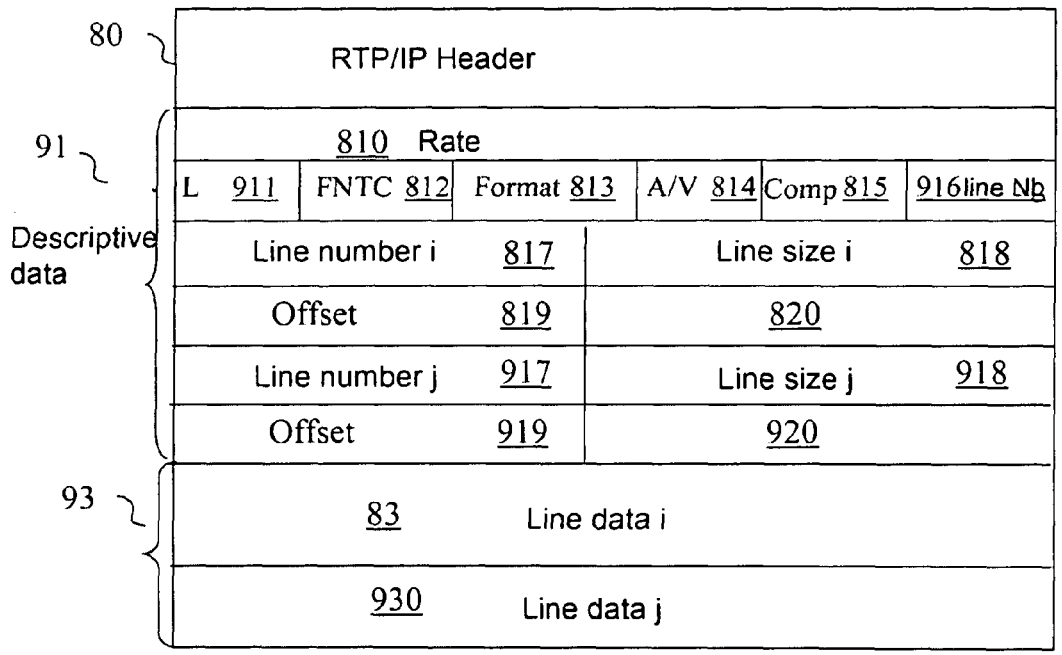
Figure 10:
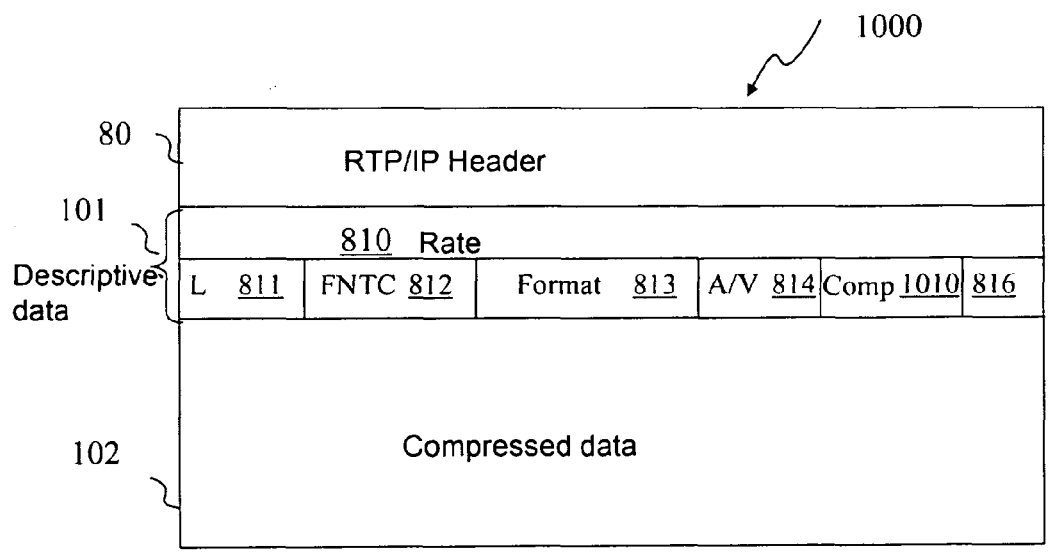
Figure 11:
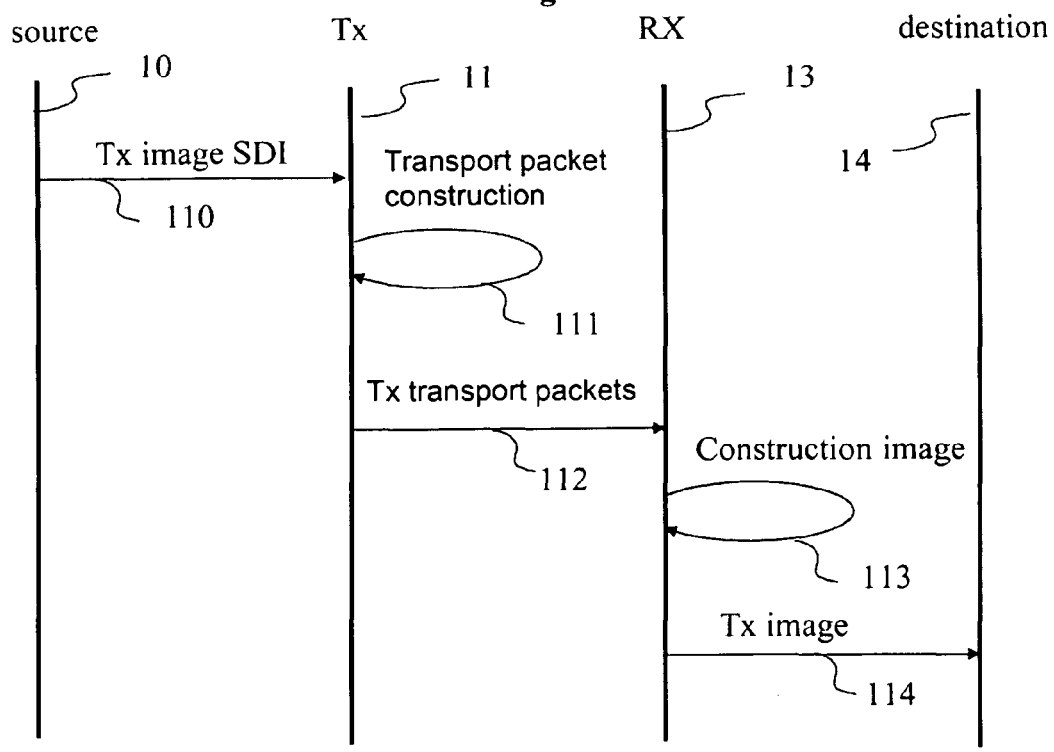

The invention will be better understood, and other specific features and advantages will emerge upon reading the following description, the description making reference to the annexed drawings wherein:

FIG. 1 illustrates an example of a communication network architecture with elements implementing the invention, FIGS. 2 and 3 diagrammatically show, respectively, a transmitter and a receiver belonging to the network of FIG. 1, according to a particular embodiment of the invention, FIG. 4 shows a method implemented in the transmitter of FIG. 2, according to a particular embodiment of the invention, FIG. 5 shows a method implemented in the receiver of FIG. 3, according to a particular embodiment of the invention, FIGS. 6 and 7 diagrammatically show the images according to a known format, FIGS. 8 to 10 diagrammatically show data packets transmitted by the transmitter of FIG. 2 to the receiver of FIG. 3 according to various embodiments of the invention, and FIG. 11 diagrammatically presents the data exchanged between various elements of the network of FIG. 1.

DETAILED DESCRIPTION OF THE INVENTION

The invention enables a transmission and reception of video images on a transmission channel.

The invention is particularly well adapted to the transmission of useful data transport packets from digital images, the digital images being received by a transmitter in a non-compressed format (for example SDI or HD-SDI) with lines of padding and, possibly, padding data in the lines comprising useful video data. It is also particularly well adapted to the reception of transport packets thus transmitted and to the construction of digital images in a non-compressed format. According to certain embodiments (for example when the ancillary data and the video data belonging to a line of data are transmitted in transport packets while preserving the link between the line number and the video or ancillary data). Advantageously the invention enables the synchronization (on a given image) to be preserved between the ancillary data (for example audio data associated with an image or information) and the video data. It also enables conservation of the entirety of the ancillary data. According to an embodiment, in which the video data are not compressed and the elementary data are not reduced, there is no loss in video quality.

FIG. 1 shows an audio/video system that comprises:
- an audio/video source 10, for example a video stream broadcaster or video stream server,
- a transmitter 11 linked to the source 10 by a serial link, for example of SDI or HD-SDI type, the serial link being adapted to the transmission of an audio/video stream from the source 10 to the transmitter 11,
- a communications network 12, for example a point to point or LAN (Local Area Network) or WAN (Wide Area Network) type network (notably of Internet network type),
- a receiver 13, and
- a destination device 14, for example an item of video/audio stream viewing (particularly television) and/or recording type equipment, the serial link being adapted for the transmission of an audio/video stream from the receiver 13 to the device 14.

The transmitter 11 and the receiver 13 are connected via the network 12 which is adapted to the transmission of transport packets, for example of RTP/IP type.

FIG. 2 diagrammatically shows a transmitter 11 architecture.

The transmitter 11 comprises, connected to each other by an address and data bus 24, also transporting a clock signal:
- a microprocessor 21 (or CPU);
- a non-volatile memory of ROM (Read Only Memory) type 22,
- a Random Access Memory (RAM) 23,
- an interface 25 to a serial link, the interface 25 being for example of SDI or HD-SDI type and being adapted for the reception of a stream of digital images,
- an interface 26 adapted for the transmission of transport packets from the transmitter 11 to the network 12, and/or
- an MMI (Man Machine Interface) 27 adapted for the display of information for the user and/or the input of data or parameters (for example the format of images of a stream received by the interface 25).

It is noted that the word "register" used in the description of memories 22 and 23 designates in each of the memories mentioned, a memory zone of low capacity (some binary data) as well as a memory zone of large capacity (enabling a whole programme to be stored or all or part of the data representing a received audio/video stream).

The ROM memory 22 comprises notably a program "prog" 220 and a description 221 of source image formats that the emitter 11 is able to accept.

The algorithms implementing the steps of the method specific to the invention and described below are stored in the ROM 22 memory associated with the transmitter 11 implementing these steps. When powered up, the microprocessor 21 loads and runs the instructions of these algorithms.

The random access memory 23 notably comprises:
- in a register 230, the operating programme of the microprocessor 21 responsible for switching on the transmitter 11,
- digital images from the source 10 in a register 231,
- video or ancillary type data extracted from digital images from the source 10 in a register 232, fragments of digital images in a register 233,
transport packets, for example of RTP/IP type, in a register 234,
line numbers of a digital image in a register 235,
numbers of digital images in a register 236,
a digital image format (from the source 10) in a register 237,
an offset value in a register 238, and
IP addresses of the transmitter 11 and receiver 13 in a register 239.

FIG. 3 diagrammatically illustrates the receiver 13.

The receiver 13 comprises, connected to each other by an addres and data bus 24, also transporting a clock signal:
a microprocessor 31 (or CPU);
a non volatile memory of ROM 32 type,
a RAM (Random Access Memory) 23,
an interface 35 to a serial link, the interface 35 being for example of SDI or HD-SDI type and being adapted for the transmission of a stream of digital images to the device 14,
an interface 36 to the network 12, the interface 36 being adapted for the reception of transport packets from the network 12, and/or
an MMI (Man Machine Interface) 37 adapted for the display of information for a user and/or input of data or parameters.

It is noted that the word "register" used in the description of memories 32 and 33 designates in each of the memories mentioned, a memory zone of low capacity (some binary data) as well as a memory zone of large capacity (enabling a whole programme to be stored or all or part of the data representing a received audio/video stream).

The ROM memory 32 comprises notably a program "prog" 320 and a description 321 of source image formats that the receiver 13 is able to accept.

The algorithms implementing the steps of the method specific to the invention and described below are stored in the ROM 32 memory associated with the receiver 2 implementing these steps. When powered up, the microprocessor 31 loads and runs the instructions of these algorithms.

The random access memory 33 notably comprises:
in a register 330, the operating programme of the microprocessor 31 responsible for switching on the receiver 13,
digital images intended for equipment 14 in a register 331,
in a register 332, ancillary or video type data extracted from transport packets from the transmitter 11 and enabling the construction of digital images for transmission to the equipment 14,
fragments enabling construction of digital images in a register 333,
transport packets, for example of RTP/IP type, from the network 12 in a register 334,
line numbers of a digital image in a register 335,
numbers of digital images in a register 336,
format of the digital image in a register 337,
an offset value in a register 338, and
IP addresses of the transmitter 11 and receiver 13 in a register 339.

FIG. 11 illustrates an example of communication between the source 10, the transmitter 11, the receiver 13 and the destination equipment 14 (these elements are represented by vertical lines; the actions, events and/or successive transmissions are chronologically illustrated). In order to facilitate the reading of the example, only one element of each type is mentioned. The example can be extrapolated to any number of sources, transmitters, receivers and destination items of equipment, one or more sources can transmit images to one or more transmitters, each transmitter can transmit transport packets to one or more receivers, each receiver can decode the transport packets received from one or more transmitters and transmit the corresponding images to one or more destination equipment.

The source 10 first transmits a stream 110 of source digital images to a transmitter 11.

Then, during step 111, the transmitter 11 filters the images received eliminating all or some of the padding lines or data to form the data sets comprising the ancillary data and/or video data extracted from received images then fragments with their descriptions and finally transport packets.

Next, the transmitter 11 transmits each transport packet to the receiver 13.

Then, during step 113, the receiver extracts useful data from each transport packet and constructs an image 114 from one or more transport packets.

Next, the receiver 13 transmits the image 114 to the destination equipment 14.

FIG. 4 shows a method implemented in the transmitter 11 according to a particular implementation of the invention.

This method begins with an initialisation phase 40 during which the different parameters of the transmitter 2 are updated.

Then, during step 41, the transmitter 11 receives a stream of digital images from the source 10 via the interface 35. The digital images comprising padding lines and data lines.

As an example, such an image 6 is shown in FIG. 6. The image complies to a source image format with non-compressed video data and comprises n" lines where:
k padding lines corresponding to a first padding zone 60 and comprising vertical deletion lines,
n data lines 6(k+1) to 6(k+n),
Vertical padding lines corresponding to a second padding zone 62, and comprising vertical deletion lines, and
n" data lines 6(k+n'+1) to 6(k+n'+n").

The source image format defines the number of source image lines, the number and position of vertical padding lines, as well as the format of each line. This format memorised in the register 237 is for example predefined by the configuration of the transmitter 11, specified by the user and/or transmitted by the source 10 via any link.

The image formats are defined by the normative documents or are specific to a system. Examples of possible image source formats corresponding to a HD-SDI image stream are described in Appendix A of the present specification that recites Appendix F of the standard SMPTE 292-2006 and indicates how to find the different parameters according to the image format and used by the invention.

For a stream of digital images of SDI type at 625 lines per image, the following parameters can be defined:
24 padding lines in zone 60,
288 data lines,
25 vertical padding lines in zone 62, and
288 data lines.

Each data line comprises 144 ancillary data points followed by 720 video data points.

According to some embodiments, the source format (as information representative of format or its description (including the image size, positioning of lines and padding data, positioning of video data) is transmitted from the source to the transmitter via any link (for example the link used for sending digital images from the source to the transmitter or another link). The source format is for example transmitted at each change in format, at the start of a transmission of a digital image stream, following an event (for example using an announcement according to a protocol (for example an announcement of an SDP (specific Session Description Protocol) session, periodically or at each digital image transmission (for example when using a specific field for a message transporting the digital image). According to other embodiments, the source format has its parameters set in the transmitter. The transmitter is then, for example, adapted for an automatic reconnaissance of format (for example by identification of certain specific fields, particularly the EAV and SAV fields), adapted for a single format by default or adapted to receive by any means an item of information on the format used (for example, via a server or a user of the transmitter).

FIG. 7 diagrammatically shows a line 7 among the data lines of image 6 and in compliance with the source format 237.

Line 7 comprises successively:
a zone 70 of the start of the line comprising an EAV (End of Active Video) field according to the SDI standards,
Non-video ancillary data in a zone 71,
a padding zone 72,
a mark 73 at the start of the active video corresponding to an SAV (Start of Active Video) field, and
video data in a zone 74.

According to a variant, the zone 74 also comprises ancillary data.

Zones 71 and 72 are optional, some lines 7 of an image comprising:
zones 71 and 72,
a zone 71 and not a zone 72, or
a zone 72 and not a zone 71.

According to a variant, the zone 70 at the start of a line 7 in compliance with the HD-SDI standard comprises an EAV field, a line number (noted as "LN" or "Line Number" according to the HD-SDI standard) and a CRC (Cyclic Redundancy Check) field that enables the detection of errors.

Next, during a step 42, the transmitter 11 filters the padding lines of a digital image received during step 41, more specifically, during this step, the transmitter 11 deletes the lines of padding zones 60 and 62. According to a variant, during this step 42, the transmitter 11 also deletes the padding zones 72 present in the lines of the received image. The transmitter 11 thus forms a set of data comprising ancillary data and video data. The transmitter 11 can delete the lines and padding zones because it knows the format of the source images. For this the transmitter uses the description of the source format from the register 221 to which points the source format present in the register 237. Hence, this description 221 advantageously describes the size of a source image corresponding to format 237 and the lines or zones of padding to be deleted during step 42. According to a variant, the register 237 directly indicates the parameters enabling the realisation of step 42 without referring to a particular image format.

Next, during a step 43, the transmitter 11 cuts up each data set into fragment of a determined maximum length so that each fragment can be inserted into a transport packet on the network 12. The length of the fragments is less than or equal to the maximum length of a transport packet less the size of the header of a transport packet and less the size of the zone describing the fragment inserted in the transport packet.

Advantageously, each fragment comprises ancillary data and video data corresponding to a whole number of data lines. Hence, the receiver can reconstitute each line more easily and is not obliged to wait for the reception of a following transport packet to end the processing of a line for which the useful data was received in a preceding transport packet.

According to a variant, the transmitter 11 performs a step of data compression between the filtering step 42 and the cutting into fragments step 43, according to any method, for example according to a coding of type ZIP or JPEG2000.

According to another variant, the transmitter 11 carries out a reduction in size (or shrink) of ancillary elementary data and/or video data of the source image. Hence, if each elementary data comprises a determined number of bits (for example ten), the transmitter 11 deletes one or several bits of low weight in each elementary data to form a reduced (shrinked) elementary data (comprising for example eight bits).

Next, during a step 45, the transmitter 11 inserts at the start of each packet a description of the ancillary data and/or video data of the fragment. Examples of the description are shown in FIGS. 8 to 10.

Then, during a step 45, the transmitter 11 inserts each fragment in a transport packet, each transport packet comprises a header according to the communication protocol used (for example a header of type RTP/IP) with an indication (for example the IP address) of the destination of the packet (in this case receiver 13) and a fragment with its description. According to a variant embodiment of the invention, a transport packet can be addressed to more than one destination (adapted to receive transport packets and process them according to the invention) by using an address of type "multicast" or by being broadcast more widely using an address of type broadcast.

Next, during a step 46, the transmitter 11 transmits the transport packets constructed during step 45 on the network 12.

Then, step 41 is reiterated.

FIG. 5 shows a method used in the receiver 13 according to a particular implementation of the invention.

This method begins with an initialisation phase 50 during which the different parameters of the receiver are updated.

Then, during a step 51, the receiver 13 receives one or more transport packets from the transmitter 11, each transport packet comprising at least one fragment of ancillary data and/or video data. The receiver 13 also receives in the transport packets or via another means an item of information representative of the format of a digital image from which the fragments of ancillary data and/or video data were extracted.

Next, during a step 52, the receiver 13 extracts fragment(s) present in the received transport packet(s).

Then during a step 53, the receiver constructs a source image from the fragment or fragments received. From the description of each fragment, the receiver 13 checks that the transport packet does not comprise errors (according to field 811 and possibly a CRC). It the transport packet comprises no errors, the receiver extracts the image number from the received transport packets and extracts all the fragments of transport packets having this image number. The receiver then constructs a destination image from at least one fragment contained in the received transport packet(s) while:
    inserting padding lines corresponding to the image format,
    constructing data lines based on the data extracted from fragments associated with a same image number and inserting, if necessary, padding data.

Thus, the receiver forms a destination digital image. Advantageously, the receiver carries out the construction of data lines and the insertion of padding data in a digital image in compliance with the information representative of a digital image format. The construction of data lines and the insertion of these elements can be done in any order: according to some embodiments, the receiver first places the ancillary data or video data in the data lines then adds the padding data, according to other embodiments, the receiver defines by default a padding line that it modifies by inserting the ancillary or video data.

When the video data are not compressed, advantageously the construction step 53 comprises an extraction of video data from each fragment corresponding to at least one line of the image, the nature of the video data being the same (non-compressed video data) in each fragment and in the constructed digital image.

According to a variant embodiment of the invention, if the transmitter has reduced the size (or shrinked) the elementary ancillary and/or video data of the source image, the receiver carries out an augmentation of the size of the data to render them compatible with the format of images to be transmitted to the item of equipment 14. To do this, the receptor inserts padding bits in each received elementary data. Hence, the bits of elementary data deleted at transmission are replaced by bits of padding (for example null bits).

According to a variant embodiment of the invention, if the received transport packets comprise compressed data (for example according to the standard JPEG2000), the receiver implements an extraction of compressed data from transport packets, a step of recognition of the compression format used (for example, by configuration or by reading of an item of information representative of this format received in a transport packet, received by another message or memorized in the receiver) and a step of decoding of compressed video data to form at least one set of non-compressed video data. The decoding step is in compliance with the method used to compress the data (for example decoding JPEG2000). The non-compressed video data form then at least one set of non-compressed video data and are inserted in the data lines in compliance with the format of the destination digital image (advantageously this corresponds to information representative of a digital image format) during step 53. These video data are then used as previously indicated to construct a digital image comprising lines of data with video data and possibly ancillary data and/or padding data.

In parallel, during a step 54, the receiver 13 extracts the timestamp from a timestamp field present in the header 80 RTP/IP and generates a clock that has the same frequency as the clock associated with the source image stream received by the transmitter 11.

Following steps 53 and 55, the receiver 13 transmits to the equipment 14 at least one digital image constructed during the preceding steps (for example an isolated digital image or a stream of digital images) via the interface 35 according to a rate corresponding to the clock generated in step 54, these images being advantageously of the same format as the source images transmitted by the source 10 to the transmitter 11.

According to a variant of the embodiment of the method for reception, the images transmitted by the receiver 13 at the equipment 14 are not in the same format as the source images transmitted by the source 10 to the transmitter 11. According to a specific implementation of this variant, the audio, ancillary and video data encapsulated in the transport packets are directly decoded by adapted decoders to, for example, generate an audio signal and/or a video signal that can be recorded or displayed. According to another specific implementation of this variant, the audio, ancillary and video data are coded according to another format (for example MPEG) to be played, recorded and/or transmitted to other destinations items of equipment.

FIG. 8 presents a structure of a transport packet comprising a fragment with data relative to a single line of a digital image.

The packet 8 comprises:
a header 80 corresponding to a header compatible with the communication protocol on the network 12 (for example RTP/IP header),
a description 81 of the fragment, and
Fragment data 83 corresponding to ancillary and/or video data corresponding to a data line i.

The description 81 of the fragment comprises:
information representative of a rate 810 corresponding to the data rate of source images transmitted by the source 10 to the transmitter (for example 270 Mbits/s),
an item of information L 811 that indicates an error in the data 83, detected by the transmitter 11, when this field is updated by the transmitter 11, it enables the receiver to be informed of the presence of this error and to react in consequence (for example during a source switching), hence, for example, the receiver 13 can put a PLL (Phase Lock Loop) in free mode without taking into account the corrupted parameters,
an FNTC information 812 corresponding to the digital image number to which the fragment belongs (and inserted by the transmitter using a counter or following a reading of a specific field in the source image),
An item of information representative of the source format 813 associated with a digital image of which the fragment is extracted,
an A/V field 814 that indicates the data type (for example ancillary and/or video),
a field 815 indicating if the video data were compressed or not by the transmitter 11, and if yes, indicating, if necessary the type of compression (for example reduction in the size of elementary data or JPEG2000 compression),
a field 817 indicating the line number in the digital image (obtained by counting the lines in the source image or by reading of a specific field in the source image),
a field 818 indicating the size of the data 83 of the line transmitted in the packet 8,
an offset field 819 indicating the position of data 83 in the line transmitted (the offset is null if the first data 83 of the fragment correspond to the start of a line, the offset points to a position in the line, of the first data 83 of the fragment, which is the case if this line is transmitted in two distinct transport packets),
An empty field 820.

The compression and its type can be defined by parameters of configuration parameters or by construction of the transmitter 11.

According to a specific embodiment, the useful data of an entire line are comprised in a single fragment. In this case, the offset field is null.

According to a variant, the ancillary data and the video data of an entire line are transmitted in two separate fragments. In this case, the offset field of the fragment comprising only the ancillary data is null and the offset field of the fragment comprising only the video data corresponds to the position of the SAV 73 field in the line. According to another embodiment of this variant, the fields EAV 70 and SAV are not transmitted and the offset field is optional: in this case, the receiver 13 can reconstruct an entire image compatible with the source image.

FIG. 9 presents a structure of a transport packet 9 comprising a fragment with data relative to one or more lines of a digital image.

The elements common to structures 8 and 9 have the same references and will not be described in further detail.

In the hypothesis where the packet 9 comprises two fragments associated with the same source image, it includes the following elements:
a header 80,
a description 91 of the fragments, and a zone 93 of data of fragments comprising fragment data 83 corresponding to the ancillary and/or video data corresponding to a first data line i and fragment data 930 corresponding to ancillary and/or video data corresponding to a second data line j.

The description 91 comprises:

an item of information representative of a rate 810, an item of information L 911 that indicates an error in the data 93 or 94, detected by the transmitter 11, an item of information FNTC 812 corresponding to the digital image number to which the fragments belong, an item of information representative of the source format 813 associated with a digital image from which are extracted the fragments 93 and 94, an A/V field 814, a field 815 indicating if the video data were compressed or not by the transmitter 11, and, if relevant, the type of compression, a field 916 corresponding to the number of lines for which the data are present in the packet 9 (here for example there are 2), a field 817 indicating the number of the data line i in the digital image, a field 818 indicating the size of the data 83 of the of the data line i, an offset field 819 indicating the position of the data 83 in the data line i, an empty field 820.

a field 917 indicating the number of the data line j in the digital image, a field 918 indicating the size of the data 930 of the data line j, an offset field 919 indicating the position of the data 930 in the data line j, and an empty field 920.

Naturally, the invention is not limited to the embodiments previously described.

In particular, the architecture of the transmitters and receivers can be different from those illustrated in FIGS. 2 and 3, in the respective function and/or form of the elements (the functions of the electronic elements can notably be grouped into a restricted number of components or, on the contrary, expanded into several components) and their layout.

The invention is not limited to a system architecture as described in respect of FIG. 1 but concerns any architecture implementing a link or network connecting at least one transmitter and at least one receiver, the transmitter transmitting source images received to the receiver.

The invention can also be applied with different communication protocols than those described above. Hence, the transport packets can be transmitted from a transmitter to one or more receivers according to any communication protocol.

Moreover, the cutting of a digital image by a transmitter into fragments then the insertion of fragments into transport packets can be done in any way, with, for example one or two lines per transport packet or an entire image in a transport packet. According to embodiments enabling a particularly simple implementation both on the transmitter side and on the receiver side, each transport packet comprises all the ancillary data and video data of a line of each source image. According to other embodiments, the ancillary or video data of a line are transmitted in part in a first transport packet and in part in one or more second transport packets, according to these embodiments, advantageously the ancillary data and video data are transmitted in distinct transport packets, the ancillary data (generally, smaller in size than the video data) can be re-grouped in a single transport packet.

Moreover, the data in a transport packet are not necessarily arranged in the same way as in the packets described in detail previously. Hence, the order of elements can differ. For example, the description of a fragment could be placed immediately before the corresponding fragment in a data packet comprising at least two fragments, this enables inserting fragments in a data packet as corresponding data are received in the transmitter, and thus reducing the latency for the transmission.

The system architecture comprising the source and at least one transmitter is also not limited to the examples described previously. In particular, according to various embodiments, the source and all or some of the transmitters can be integrated in the same item of equipment or conversely, be completely separate.

Likewise, the system architecture comprising a receiver and at least a digital image destination is also not limited to the examples described previously. In particular, according to various embodiments, the receiver and all or some of the plurality of destinations can be integrated in the same item of equipment or conversely, be completely separate.

Moreover, according to some embodiments, a transmitter and a receiver are adapted to a single source image format or, according to other embodiments, a transmitter and a receiver are adapted to at least two source image formats.

Appendix A

The following tables recites the source image formats defined by Appendix F of the standard SMPTE 292-2006, each column representing successively:

a format identifier, a system nomenclature,

Luma or RGB samples per active line, number of active lines per frame, a frame rate (in HZ), a sampling frequency fs (in MHz), a Luma sampling period number for a total line, and a number of total lines per frame.

For a given format, the size of the image is defined by the number of total lines per frame. The number of padding lines is defined by the subtraction of this number of lines and the number of active lines. The position of these padding lines is indicated in other normative documents (for example SMPTE 274M for the first table corresponding to a 1920×1080 nomenclature or by SMPTE 296M for the second table corresponding to a 1280×720 nomenclature).

The structure of each active line (or line of video data) and the position of padding data are also determined by the normative documents.

| System No. | System nomenclature | Luma or R'G'B' samples per active line (S/AL) | Active lines per frame (AL/F) | Frame rate (Hz) | Interface sampling frequency fs (MHz) | Luma sample periods per total line (S/TL) | Total lines per frame |
|---|---|---|---|---|---|---|---|
| 1 | 1920 × 1080/60/P | 1920 | 1080 | 60 | 148.5 | 2200 | 1125 |
| 2 | 1920 × 1080/59.94/P | 1920 | 1080 | 60/1.001 | 148.5/1.001 | 2200 | 1125 |
| 3 | 1920 × 1080/50/P | 1920 | 1080 | 50 | 148.5 | 2640 | 1125 |
| 4 | 1920 × 1080/60/I | 1920 | 1080 | 30 | 74.25 | 2200 | 1125 |
| 5 | 1920 × 1080/59.94/I | 1920 | 1080 | 30/1.001 | 74.25/1.001 | 2200 | 1125 |
| 6 | 1920 × 1080/50/I | 1920 | 1080 | 50 | 74.25 | 2640 | 1125 |
| 7 | 1920 × 1080/30/P | 1920 | 1080 | 30 | 74.25 | 2200 | 1125 |
| 8 | 1920 × 1080/29.97/P | 1920 | 1080 | 30/1.001 | 74.25/1.001 | 2200 | 1125 |
| 9 | 1920 × 1080/25/P | 1920 | 1080 | 25 | 74.25 | 2640 | 1125 |
| 10 | 1920 × 1080/24/P | 1920 | 1080 | 24 | 74.25 | 2750 | 1125 |
| 11 | 1920 × 1080/23.98/P | 1920 | 1080 | 24/1.001 | 74.25/1.001 | 2750 | 1125 |

| System No. | System nomenclature | Luma or R'G'B' samples per active line (S/AL) | Active lines per frame (AL/F) | Frame rate (Hz) | Luma or R'G'B' sampling frequency fs (MHz) | Luma sample periods per total line (S/TL) | Total lines per frame |
|---|---|---|---|---|---|---|---|
| 1 | 1280 × 720/60 | 1280 | 720 | 60 | 74.25 | 1650 | 750 |
| 2 | 1280 × 720/59.94 | 1280 | 720 | 60/1.001 | 74.25/1.001 | 1650 | 750 |
| 3 | 1280 × 720/50 | 1280 | 720 | 50 | 74.25 | 1980 | 750 |
| 4 | 1280 × 720/30 | 1280 | 720 | 30 | 74.25 | 3300 | 750 |
| 5 | 1280 × 720/29.97 | 1280 | 720 | 30/1.001 | 74.25/1.001 | 3300 | 750 |
| 6 | 1280 × 720/25 | 1280 | 720 | 25 | 74.25 | 3960 | 750 |
| 7 | 1280 × 720/24 | 1280 | 720 | 24 | 74.25 | 4125 | 750 |
| 8 | 1280 × 720/23.98 | 1280 | 720 | 24/1.001 | 74.25/1.001 | 4125 | 750 |

The invention claimed is:

1. A method of transmission of digital images, wherein said method is implemented by a transmitter device, and said method comprises:
   receiving a source digital image comprising padding lines corresponding to padding zones and data lines, the data lines comprising ancillary data and video data;
   filtering padding lines from the source digital image to form sets of data comprising ancillary data and video data in which padding lines are deleted;
   cutting the sets into fragments of a maximum fragment length that is a function of a maximum transport packet length;
   inserting at least one image number in each of said fragments, each of the ancillary data and video data being associated with an image number;
   inserting said fragments into transport packets; and
   transmitting said transport packets according to an internet protocol.

2. The method according to claim 1, wherein said method further comprises inserting an item of information representative of the source digital image format in said fragments.

3. The method according to claim 1, wherein the receiving of a source digital image is made on a serial interface.

4. The method according to claim 1, wherein the transmitting said transport packets is made on a link according to an Internet protocol.

5. The method according to claim 1, wherein the video data of each fragment correspond to a single image line of a source digital image, the nature if video data being the same in the source digital image and in each fragment.

6. The method according to claim 1, wherein the video data of each fragment correspond to at least two lines of the source digital image, the nature if video data being the same in the source digital image and in each fragment.

7. The method according to claim 1, wherein said method further comprises reducing in size of each elementary item of data.

8. The method according to claim 1, wherein said method further comprises compressing video data of the source digital image to form at least one set of compressed video data, each fragment comprising said at least one set of compressed video data.

9. The method according to claim 1, wherein in each source digital image, the video data are not compressed.

10. A method of reception of transport packets, wherein each transport packet comprises data representative of at least one part of a digital image, said method is implemented by a receiver device and said method comprising:
   receiving at least one transport packet according to an internet protocol, each transport packet comprising at least a fragment of ancillary data or video data, and each fragment comprising an image number;
   constructing lines of data comprising video data and being able to contain ancillary data from at least one fragment contained in said at least one transport packet, from fragments associated to a same image number;
   inserting said lines of data and an insertion of padding lines corresponding to padding zones in a digital image, to form a digital image.

11. The method according to claim 10, wherein said method further comprises receiving an item of information representative of a digital image format, said constructing and said inserting said lines of data and padding lines corresponding to padding zones in a digital image being carried out in compliance with said information representative of a digital image format.

12. The method according to claim 10, wherein said method further comprises transmitting the digital image to a destination equipment.

13. The method according to claim 10, wherein said constructing comprises an extraction of video data from each fragment corresponding to at least one line of the image, the nature of video data being the same in each fragment and in the digital image.

14. The method according to claim 10, wherein said method further comprises inserting padding bits in each elementary item of data received.

15. The method according to claim 10, wherein said method further comprises decoding compressed video data to form at least a set of non-compressed video data.

16. The method according to claim 10, wherein in the digital image, the video data are not compressed.

* * * * *